No. 772,830. PATENTED OCT. 18, 1904.
W. E. SCHNEIDER.
BOX MAKING MACHINE.
APPLICATION FILED SEPT. 24, 1903.
NO MODEL. 9 SHEETS—SHEET 1.

WITNESSES:

INVENTOR
Wm. E. Schneider,
BY Edson Bros
Attorneys

No. 772,830. PATENTED OCT. 18, 1904.
W. E. SCHNEIDER.
BOX MAKING MACHINE.
APPLICATION FILED SEPT. 24, 1903.
NO MODEL. 9 SHEETS—SHEET 3.

Fig. 4.

WITNESSES:
INVENTOR
Wm. E. Schneider,
BY
Attorneys

No. 772,830. PATENTED OCT. 18, 1904.
W. E. SCHNEIDER.
BOX MAKING MACHINE.
APPLICATION FILED SEPT. 24, 1903.
NO MODEL. 9 SHEETS—SHEET 4.

Fig. 5.

WITNESSES:
INVENTOR
Wm. E. Schneider,
BY Edson Bro's
Attorneys

No. 772,830. PATENTED OCT. 18, 1904.
W. E. SCHNEIDER.
BOX MAKING MACHINE.
APPLICATION FILED SEPT. 24, 1903.
NO MODEL. 9 SHEETS—SHEET 9.

WITNESSES:

INVENTOR
Wm. E. Schneider,
BY Edson Bros
Attorneys

No. 772,830. Patented October 18, 1904.

UNITED STATES PATENT OFFICE.

WILLIAM EDWIN SCHNEIDER, OF WASHINGTON, DISTRICT OF COLUMBIA.

BOX-MAKING MACHINE.

SPECIFICATION forming part of Letters Patent No. 772,830, dated October 18, 1904.

Application filed September 24, 1903. Serial No. 174,499. (No model.)

*To all whom it may concern:*

Be it known that I, WILLIAM EDWIN SCHNEIDER, a citizen of the United States, residing at Washington, in the District of Columbia, have invented certain new and useful Improvements in Box-Making Machines; and I do hereby declare the following to be a full, clear, and exact description of the invention, such as will enable others skilled in the art to which it appertains to make and use the same.

My invention relates to improvements in box-making machines.

It has for its object, more especially, the making of boxes from pulp, the character of the latter, however, having no bearing whatever upon the invention; but for convenience in using the same it is stated that pulp produced from wood, papier-mâché, asbestos, &c., is capable of treatment or manipulation by said invention.

It has for a further object to effect the foregoing in a direct, simple, and effective manner, and particularly with rapidity, providing for the making of boxes in large numbers in the minimum time.

Other advantages of said invention will appear in the further disclosure thereof.

Said invention consists of certain parts and combinations and arrangements thereof, substantially as hereinafter more fully disclosed, and specifically pointed out by the claims concluding the following specification.

In the accompanying drawings, illustrating the preferred embodiment of my invention.

In carrying out my invention I erect a general framework, preferably raised upon legs and comprising a base-plate 1, carrying a trough $1^a$ around its edge, and depending from the center of which is a box $1^b$, having its bottom open, except the corners, which are closed by corner-pieces $1^c$, suitably bolted to the outside of said box. Horizontal slots $1^d$ are provided, one on each side of the broader sides of said box, in which operate pins fixed to corner-pieces of the mandrel, presently described. Said box is also provided with vertical slots $1^e$, in which work pins secured to the wedge-pieces of the mandrel. Supported on said bed-plate are fixed angular uprights or bars 2, one at each corner, supporting near their upper end a frame 9. Above said frame 9 are pivoted spring-pressed catches 8, engaged by springs $8^c$, which bear against undercut notches $8^{bb}$ (See Fig. 17.) Said catches normally engage and support a frame $8^e$, to lugs $8^{ab}$ of which are connected other catches $8^×$, receiving the action of stirrup-like springs $8^{aa}$, secured to their pivots and carrying depending rods $8^a$, extending through apertured stop-bars $8^b$, fixed to the frame 9, with their lower ends provided with pins or keys 8$^{xx}$. The frame 8$^e$ supports frames 15, having cross-pins 16 and upper cross-pieces 15$^x$, one of said latter frames arranged at each side of the machine between the flanges of the bars 2. Arranged interiorly of each of said frames 15 is a lateral or end foraminous former or follower 4, vertically disposed and lined with wire fabric or netting 4$^a$ to provide for the expressing of the excess of moisture from the pulp while undergoing formation into a receptacle or box, which, among other purposes, may be used as an electric storage-battery jar or cell. The cross-pins 16 of the frames 15 extend through cam-slots 4$^c$, being partially diagonal and partially straight in outwardly-extending flanges or extensions 4$^b$ of said followers or formers and into the slots 3 of the bars 2.

An operating-lever 5 is pivotally connected to and passes between upstanding bars 6, secured to a horizontal plate 6$^a$, carrying a head or plunger 6$^b$, said bars having laterally fixed thereto bevel-ended arms or dogs 7, adapted to engage the studs 8$^d$ of the catches 8. The plate 6$^a$ is adapted to displace the shoulders of the catches 8$^x$, which are preferably beveled on their upper edge for that purpose, said plate being adapted to seat within the frame 8$^e$, and the catches 8$^x$ being capable of returning to their normal position after the passage of the plate 6$^a$, so as to retain said plate in connection with said frame.

Figures 14, 15, 16, 17:
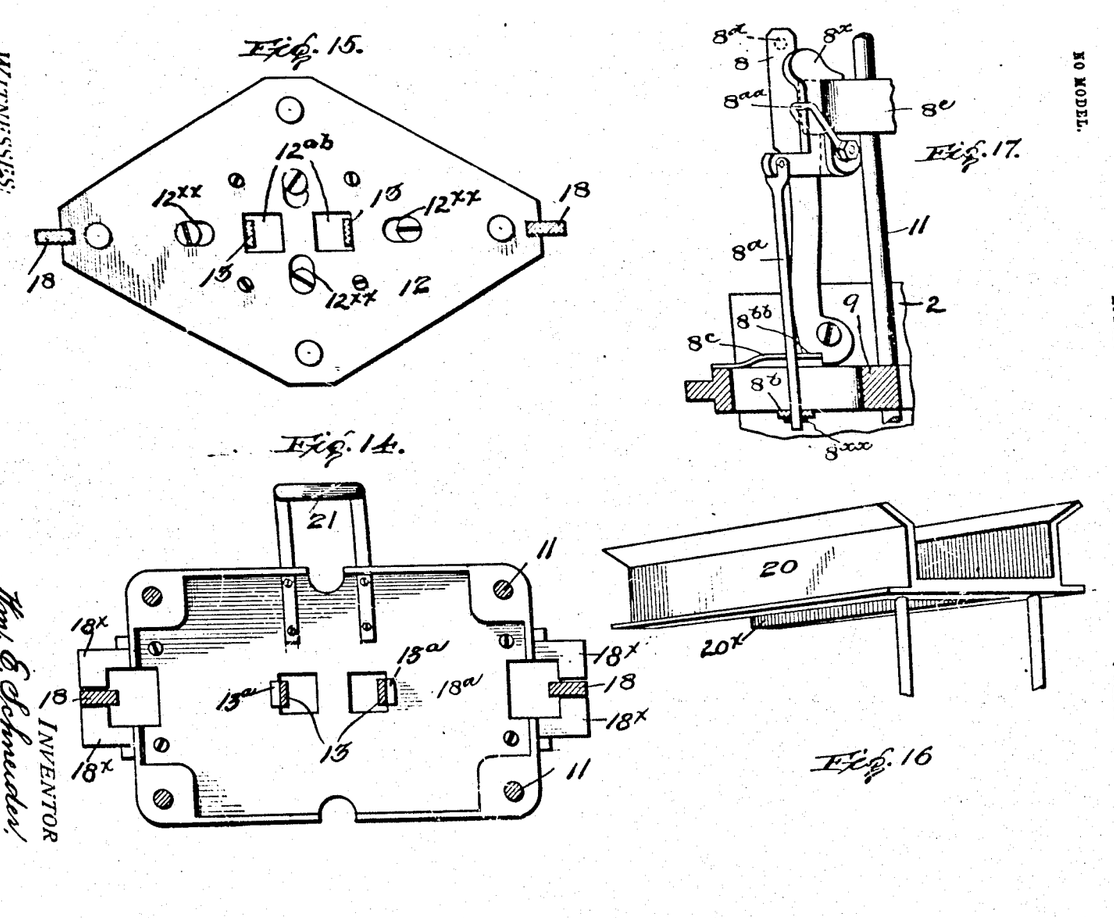
Fig. 14 is an enlarged horizontal section taken on the line $b$ $b$ of Fig. 2, showing more particularly the mandrel-tripping-bar-engaging plate.
Fig. 15 is a like section taken on the line $a$ $a$ of Fig. 2, disclosing more fully the mandrel-engaging plate.
Fig. 16 is a perspective view of the tray or chute receiving the completed box.
Fig. 17 is a broken detailed view of the dog-engaged catches, holding together at certain intervals the top plate and frame, presently more fully disclosed.

From the corners of the plate 6$^a$ rods 11 extend downwardly, passing through suitable apertures in the framework, and support at their lower extremity a plate 18$^a$, which carries spring-pressed catches or bolts 18$^x$, each comprising two L-shaped fingers or arms facing each other and adapted to pass up and down on opposite sides of the spring-acted-upon bars or arms 18, as shown most clearly in Fig. 14. Said plate 18$^a$ has secured thereto an angular arm 21, adapted to operate the box-conveyer, presently described.

Figure 1:
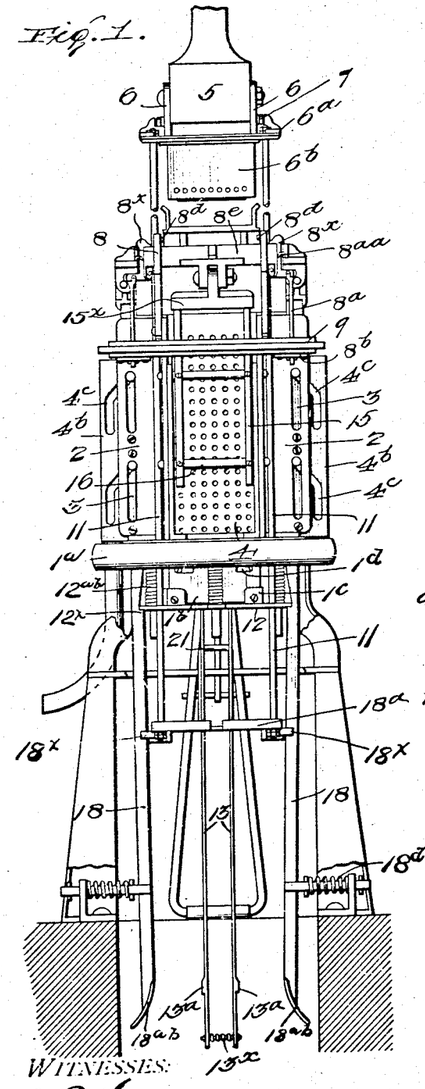
Figures 1 and 2 are views in elevation at right angles to each other.

The arms 18 are pivoted at their upper ends to the base-plate 1 and have shoulders 12$^x$, adapted to normally engage and uphold the mandrel-supporting plate 12, said arms being pressed inward by means of springs 18$^a$, arranged near the base of the framework, as shown in Fig. 1. Said arms 18 are provided with arcuate flattened plates 18$^a$ at their extremities, which are adapted to be engaged by the catches 18$^x$ for "dropping" the mandrel. The mandrel-supporting plate 12 when resting upon the shoulders of the arms 18$^a$ is located immediately below and engages the bottom of the box 1$^b$; but suitable springs 12$^{ab}$ are arranged between said plate and the base-plate to occasion the depression of said plate 12 when the arms 18$^a$ are spread to collapse the mandrel.

Figure 4:
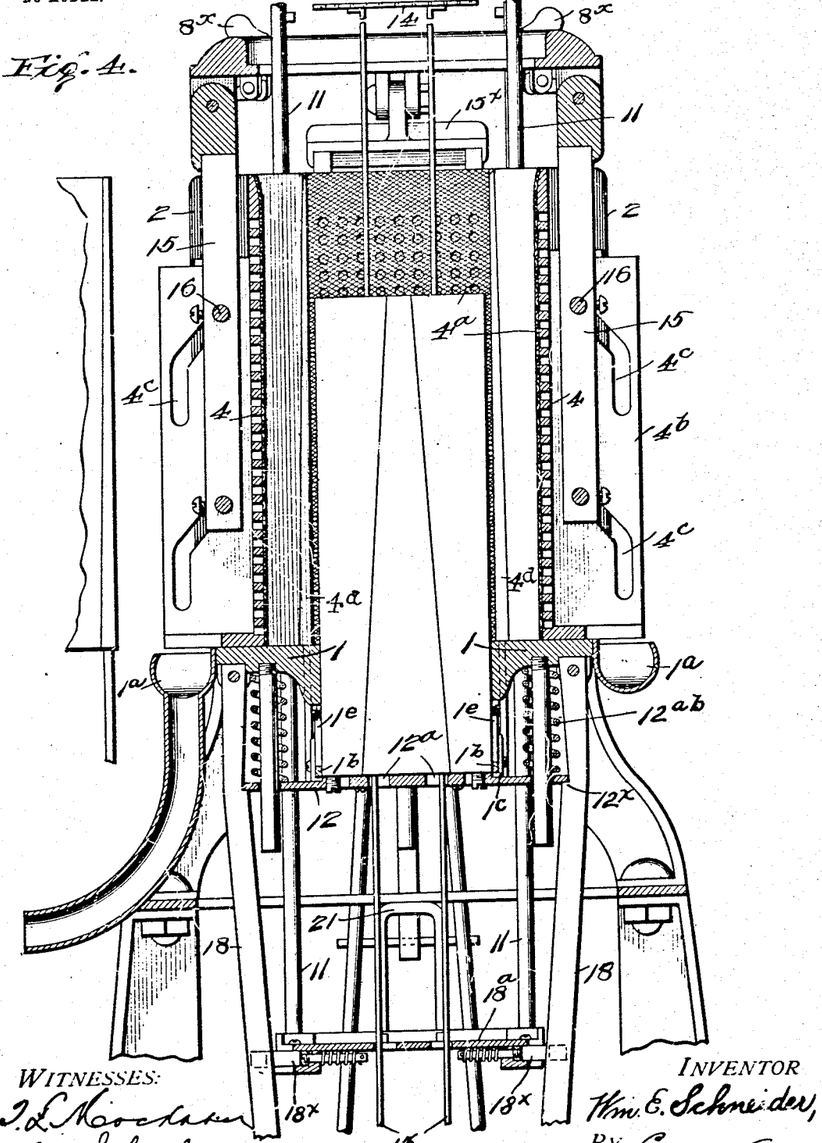
Fig. 4 is a sectional elevation, parts also being broken away.
Figure 5:
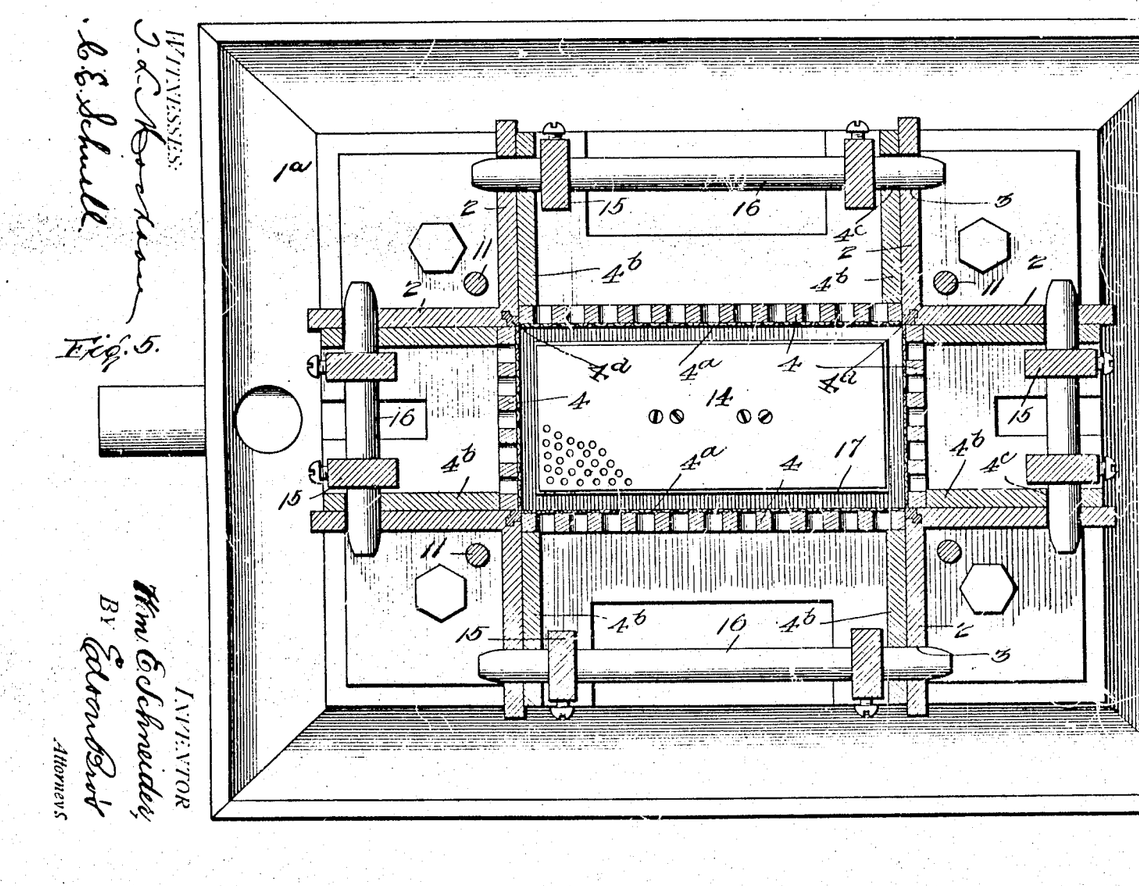
Fig. 5 is a horizontal section, with the plunger and mandrel and the followers or formers in position as in the act of compressing the material or pulp into shape to form the sides and ends or walls and bottom of the prospective box.
Figure 6:
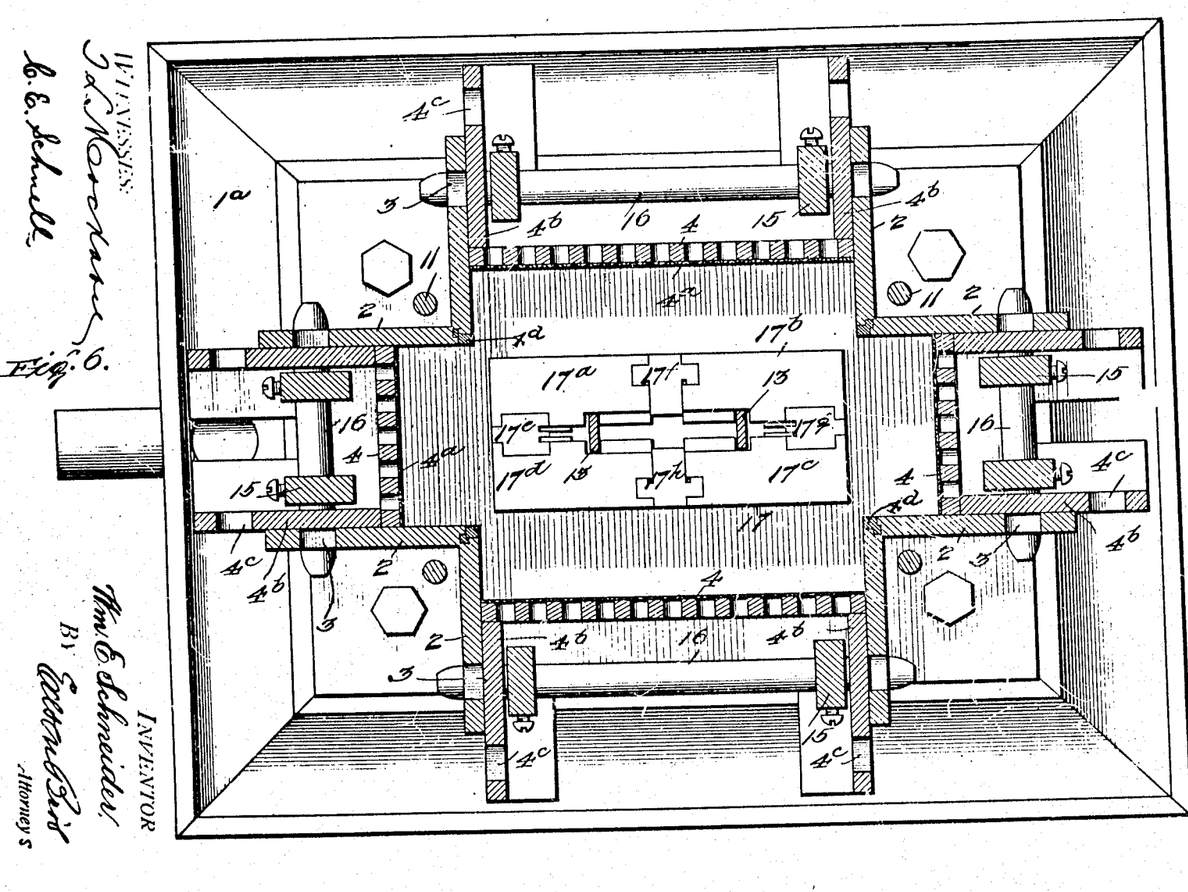
Fig. 6 is a similar section, with the aforesaid parts or members in their initial or inoperative position.
Figure 7:
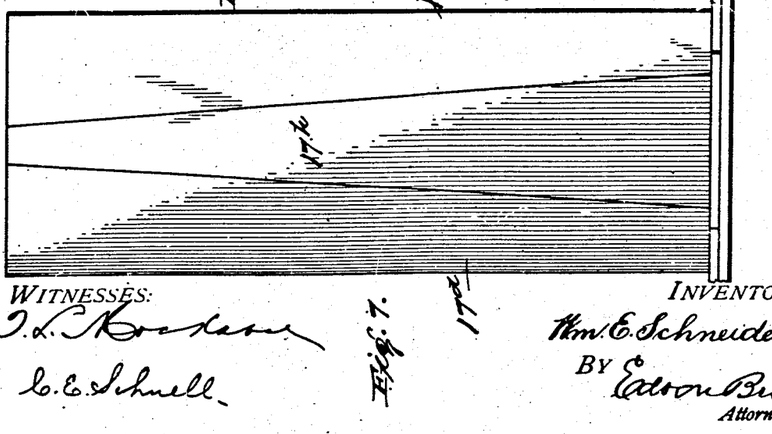
Figs. 7, 8, 9, and 10 are views disclosing the mandrel in side and end elevation and the parts or members thereof in initial and final or normal position, respectively.
Figure 8:
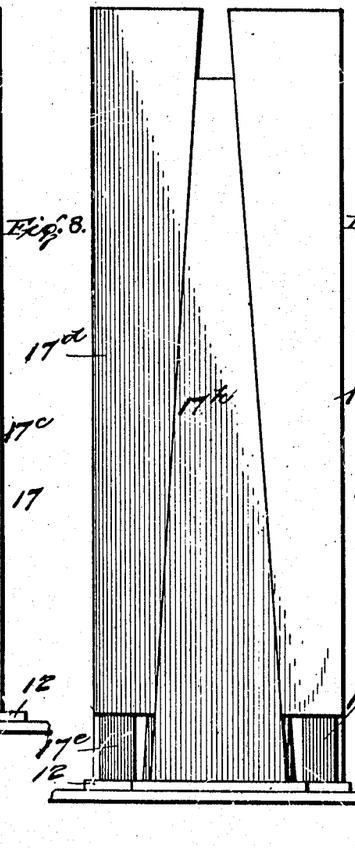
Figure 9:
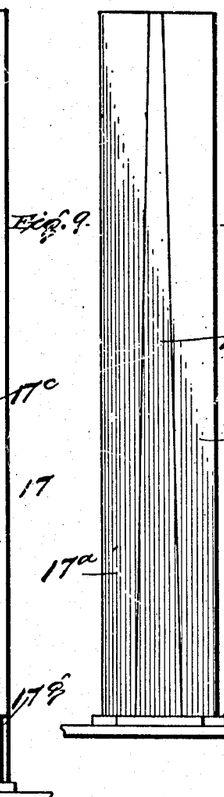
Figure 10:
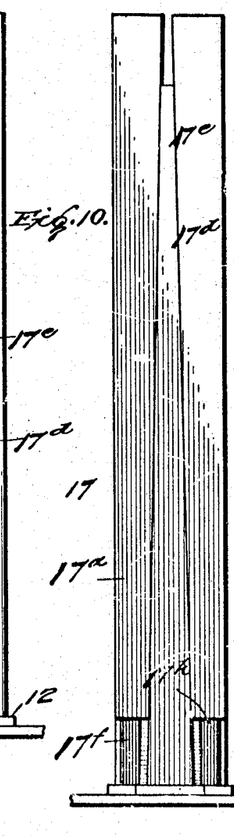
Figure 11:
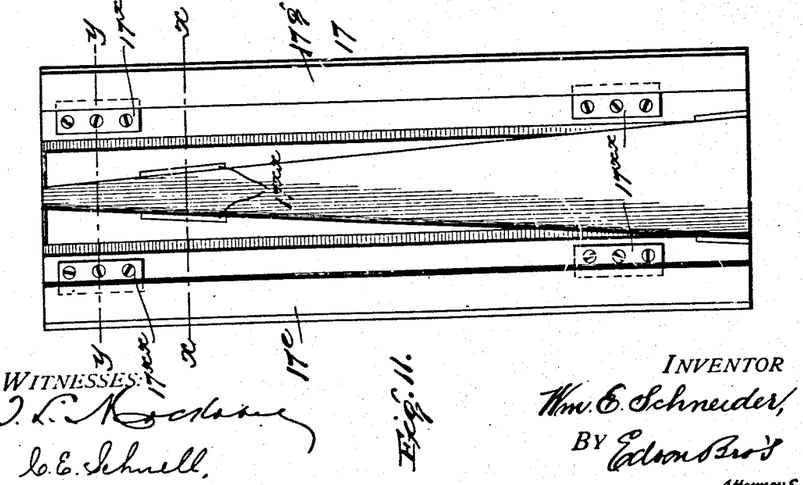
Figs. 11, 12, and 13 are still further views of the mandrel, core, or former, the first being an interior view and the latter two being sections taken on the lines $x$ $x$ and $y$ $y$ of the first, respectively.
Figure 12:
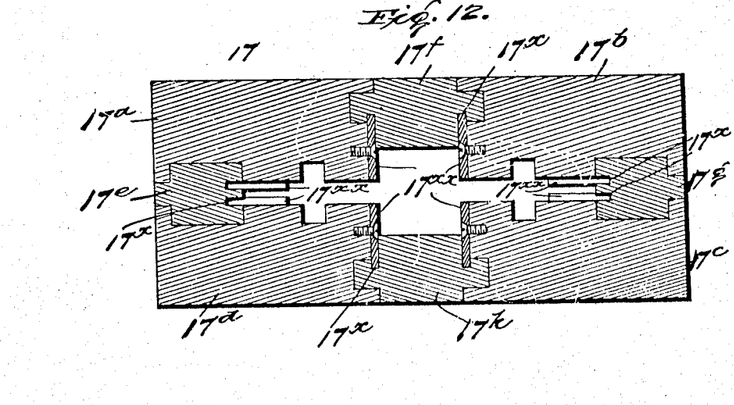

The mandrel or core 17 comprises four corner sections or members 17$^a$ 17$^b$ 17$^c$ 17$^d$ and four wedge sections or members 17$^e$ 17$^f$ 17$^g$ 17$^h$ to provide for the collapsing of the mandrel, as necessary in removing the box after its formation. Said corner sections or members are so connected or held together as to retain their general initial outline when collapsed, as the wedge members or sections are partially withdrawn or "dropped" to effect that purpose. To that end said wedge sections or members are interiorly grooved, as at 17$^x$, vertically, and angular plates or guides 17$^{xx}$, secured to the corner-sections, engage said grooves, but permit said sections to contract as the wedge-sections are projected or dropped. Said wedge members have pin-and-slot connections, as at 12$^{xx}$, with the plate 12, as shown in Fig. 15, and also with the box 1$^b$ through the slots 1$^e$. By means of said slots the wedge-sections may move downward and inward at the same time. The corner-sections of the mandrel are supported on the angle-pieces 1$^c$ at the corners of the box 1$^b$ and also by pins fixed thereto engaging the horizontal slots 1$^d$, the head of said pins being long enough to permit said corner-sections to shrink in together as the mandrel collapses. If desired, wedge-shaped corner-pieces 4$^d$ (see Figs. 4, 5, and 6) may be suitably keyed or guided in receiving-grooves in the inner edges of the angular bars 2 and suitably connected to the plate 12, whereby they can be withdrawn at the same time the mandrel is collapsed, the withdrawal of said corner-pieces rendering the machine capable of forming cleaner and better edges on the box or receptacle.

Figure 2:
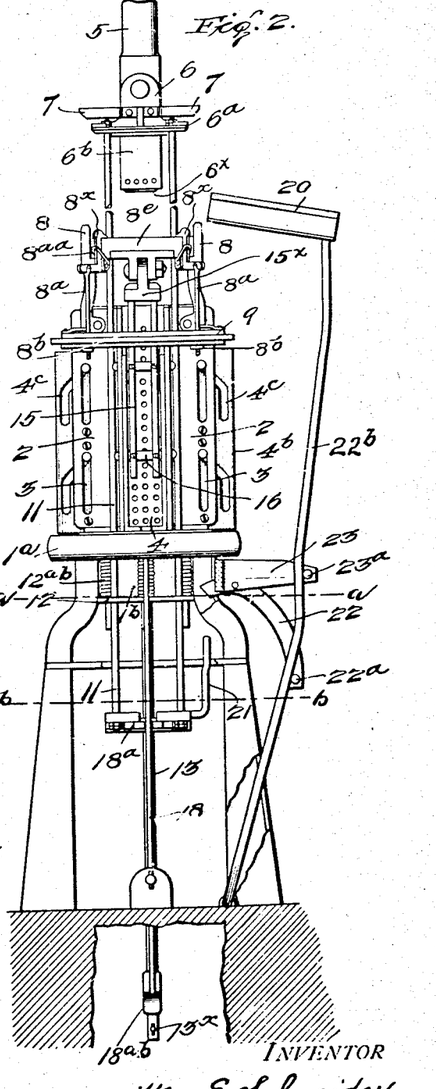
Figure 3:
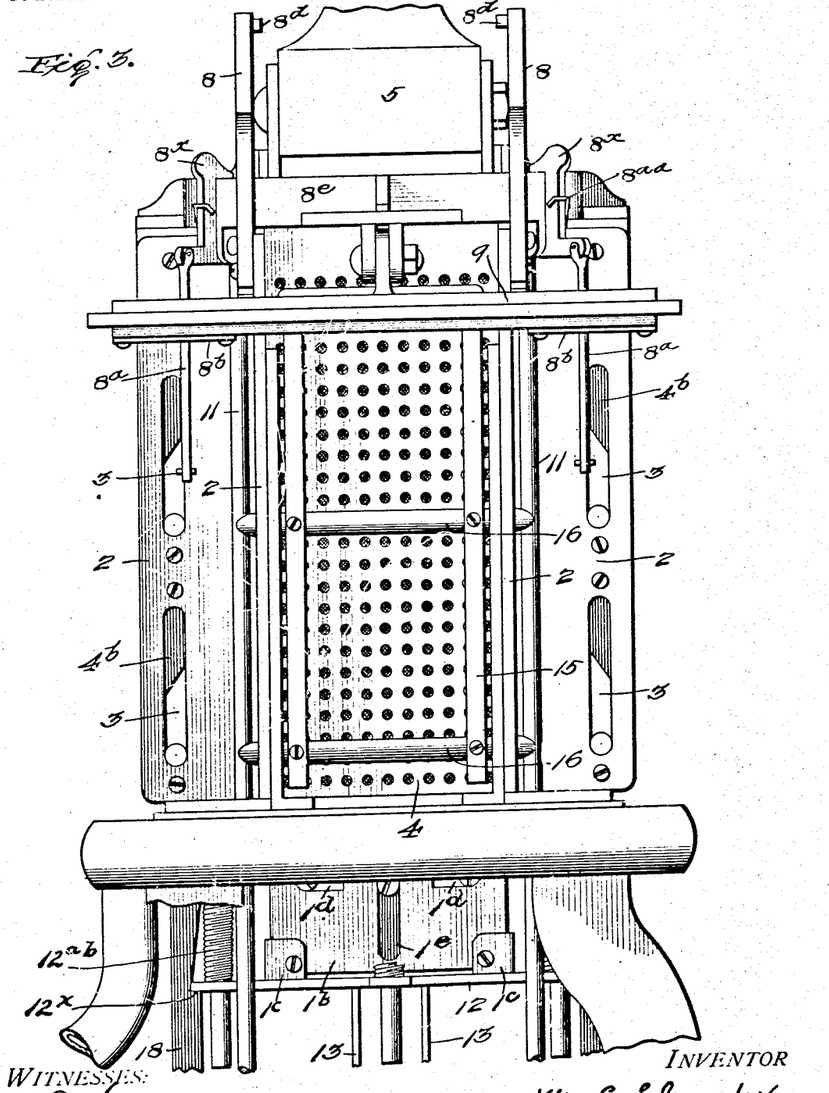
Fig. 3 is an enlarged side elevation, parts being broken away.
Figures 13, 24:
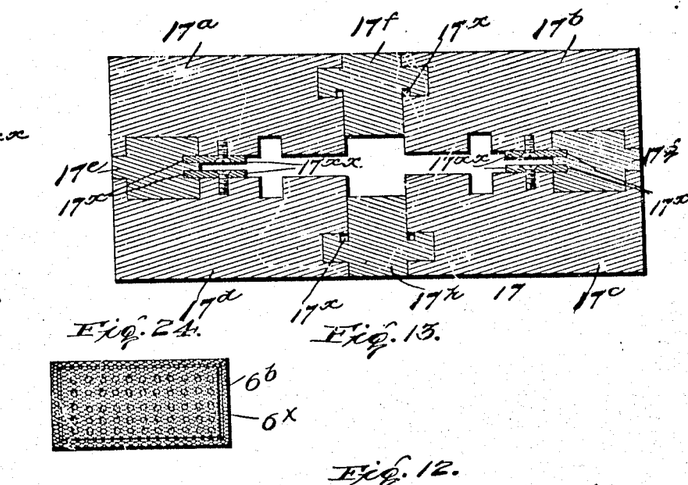
Fig. 24 is a detail view of the lower end of the plunger.

The upper end of the mandrel is covered by a plate 14, having pendent rods 13, depending through apertures in the mandrel and the plates 12 and 18$^a$. Plate 14 is preferably perforated, so that the water pressed from the pulp in forming the bottom of the box is adapted to pass through said plate down through the center of the mandrel and collect, with the water from the formation of the sides of the box, in the trough around the base-plate, from which it passes off through a suitable outlet-pipe. The plunger 6$^b$ may be perforated on its face and sides, as shown in Figs. 1, 2, and 24, to provide an upward passage for the water, if desired. Said rods 13 are yoked together at their lower end, as at 13$^x$, and have a spring tending to force them apart. Said rods are provided with lateral offsets or shoulders 13$^a$, which are adapted to rest upon the plate 18$^a$ and support the plate 14 to raise the same with a completed box to remove the latter. When said plate 18$^a$ comes nearly into contact with the plate 12, the shoulders 13$^a$ will strike the edges of the apertures 12$^{ab}$ in said plate 12 and be forced inward, disengaging them from the plate 18$^a$, when the rods and plate 14 will fall.

An arm 21, carried by the plate 18$^a$, is adapted to engage a pivoted lever 22, throwing inward one end of said lever, provided with a lateral pin 22ª, pressing inward the upstanding arm 22ᵇ, pivoted at the base of the machine and carrying the box-carrier 20 at its upper end, thereby disposing said carrier in position to receive the finished box after it has been raised upon the plate 14. The outward movement of the arm 22ᵇ is limited by a cross-pin 23ª, carried by a bracket 23, fixed to the machine-frame. Said carrier 20, as clearly shown in Fig. 16, is entirely open at its inner end, as is its center, so that it may pass below the box when said box is raised upon the plate 14 and permit said plate to drop while it retains the box upon suitable ledges 20ˣ along the inner side of said carrier.

Figure 18:
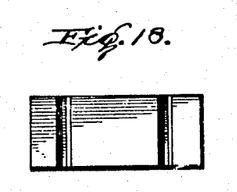
Figs. 18 and 19 are detail views of the mandrel cover-plate and the upper end of the mandrel modified in construction to form ribs in the bottom of the box.
Figure 19:
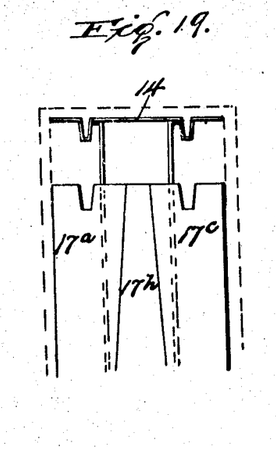
Figure 20:
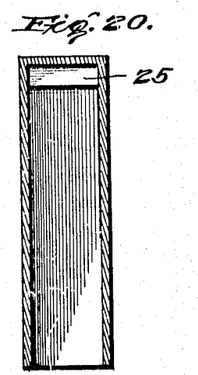
Figs. 20, 21, 22, and 23 are detail views of a battery-cell which may be produced by my machine.
Figure 21:
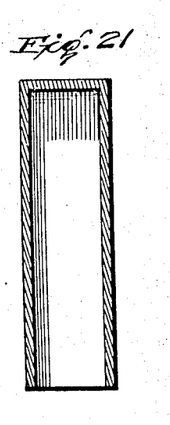
Figure 22:
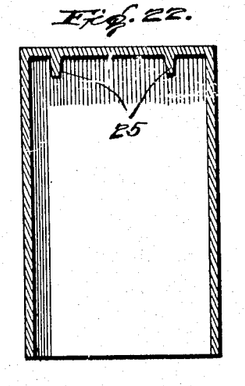
Figure 23:
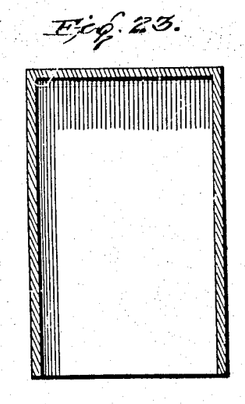

In Figs. 20 and 22 is disclosed a receptacle or box provided with a series of internal cleats or upward projections 25 upon the bottom thereof, the purpose being to prevent short-circuiting, as would otherwise be the case by the accumulation of the active material in the bottom of the jar contacting with the electrodes when said jar is used for a storage or other battery. In Figs. 18 and 19 is shown the modified form of the plate 14 and upper surface of the mandrel used for forming said cleats. It will be noted also that the receptacle or box may be formed with lateral ribs or braces, if desired, by changing the formation of the sides of the mandrel and that of the followers or formers to suit the purpose, the result of which would be the production of a box with strong but much lighter walls, which would be particularly desirable for packing or shipping purposes.

In operation, the various parts of the machine being in the positions indicated in Figs. 1 and 2, in which the mandrel is shown set or expanded and the plate 14 resting upon the top of the mandrel after the pulp for the making of the prospective box has been introduced into the machine around said mandrel within the followers or formers 4, the lever 5 is forced downward. The dogs 7, carried by the bars 6, engage the studs 8ᵈ of the spring-catches 8, and at the same time the plate 6ª engages the catches 8ˣ, forcing them outward and passing beneath them into its seat in the frame 8ᵉ, thus connecting up said plate with said frame while the catches 8 are forced outward by the dogs 7, leaving said frame free to move downward. As said frame moves downward it carries with it the frames 15, whose cross-pieces 16, moving in the vertical slots 3 of the pieces 2 and the diagonal portions of the slots 4ᶜ in the followers or formers 4ᵇ, cause said followers or formers to move inward, compressing the pulp and forming the sides of the box. Some of the pulp will be forced upward, increasing the thickness thereof in the top of the receptacle formed by said followers or formers, and upon this the plunger 6ˣ descends as the cross-bars 16 reach the vertical portions of the cam-slots 4ᶜ and move down along them. The plunger will scrape down any pulp which may have splashed up upon the inner surfaces of the followers or formers and will make a clean edge around the bottom of the box as it compresses the pulp forming the same. If desired, the face of the plunger may be adapted, as at 6ˣ, to emboss the bottom of the receptacle or box being formed. The plate 18ª being connected to the plate 6ª by the rods 11 moves down with said latter plate, the arms of the catches 18ˣ passing along the rods 18 and out around their terminal plates 18ᵃᵇ, the springs of said catches allowing them to be withdrawn for that purpose, but retracting them after they have passed the extremities of said plates 18ᵃᵇ at the end of the downward stroke of the lever 5. At the same time the plate 18ª is passing the plate 18ᵃᵇ of the rods 18 the lugs near the extremities of the rods 13 are pressed inward by the edges of the apertures in said plates 18ª, through which they pass, and as the latter plate descends past said lugs they spring out again, so that they will engage said plate, as shown in Fig. 14, on its upward movement. On the upward stroke of the lever 5, carrying with it the plate 6ª, the frame 8ᵉ, frames 15, and the plate 18ª while the cross-bars 16 of said frame 15 are moving upward in the vertical portions of the cam-slots 4ᶜ the arms of the catches 18ᵃᵇ on the plate 18ª engage the inner faces of the plates 18ᵃᵇ and spread the rods 18, releasing the plate 12, which drops, carrying with it the wedge-sections of the mandrel and collapsing the latter. As the lever 5 continues its upward movement, carrying with it the mechanism above noted as controlled thereby, the cross-pins of the slots 15 travel in the diagonal portions of the slots 4ᶜ, retracting the followers or formers, leaving the finished box free to be removed. At this point in the operation the lugs 13ª will be engaged by the plate 18ª and the rods 13 with the plate 14, fitting below the bottom of the completed box and above the top of the mandrel, will be carried upward, elevating the box. As the frame 8ᵉ reaches the prescribed height it will be engaged and upheld by the catches 8 and the catches 8ˣ will be withdrawn by their rods engaging the stop-bars 8ᵇ, thus releasing the plate 6ª and allowing it to move upward without the frame 8ᵉ. When the box has reached a point above the frame 8ᵉ, the arm 21, carried by the plate 18ª, engages the inner end of the lever 22, forcing the outer end of said lever inward and bringing the carrier 20 inward below the box. While said carrier is retained in position below the box—that is, while the end of the arm 21 is traveling across the inner end of the lever 22—the plate 18ª comes in contact with the plate 12, releasing the rods 13 from the plate 18ª, allowing the plate 14 to fall and leaving the box upon the carrier, which as soon as the end of the arm 21 passes the end of the lever 22 will be carried outward by gravity and deliver the box from the machine. During the completion of the upward stroke the plate 18ª carries the plate 12 upward and seats it upon the shoulders 12ˣ of the arms 18, thereby setting or expanding the mandrel, when the machine is ready for the making of another box by repeating the operation just described.

It is observed that any form or contour of box, barrel, or cask for any purpose may be made by my machine by accordingly adapting the end and lateral wall formers and the mandrel or core to that end. It will be understood that I do not limit myself as to details herein, as they may be changed as circumstances suggest without departing from the spirit of my invention and said invention remain intact and be protected.

Having thus described my invention, what I claim as new, and desire to secure by Letters Patent, is—

1. A box-making machine, comprising a collapsible mandrel or core, side and end wall formers and top-pressure-applying means, operatively arranged and actuated.

2. In a machine of the character described a collapsible mandrel or core, a bottom bearing-plate for said mandrel, lateral and end wall formers a top-pressure-applying plate, and means for actuating said latter plate.

3. In a box-making machine, a collapsible mandrel or core, means for bearing said mandrel or core, end and lateral wall formers, and a plate and means for actuating said plate for removing the box from said mandrel or core.

4. In a box-making machine, a collapsible mandrel or core, a top-pressure-applying plate or plunger, end and lateral wall formers, means for moving said formers horizontally with relation to said mandrel, and a bottom bearing-plate for said mandrel.

5. In a box-making machine, a collapsible mandrel or core, means for carrying said core, lateral and end wall formers, a top-pressure-applying plate or plunger, and a plate for elevating or removing the box from said mandrel.

6. In a box-making machine, a collapsible mandrel or core, means for bearing said mandrel, end and lateral wall formers, means for applying pressure from above, to the forming box, and cam-actuating means for said end and lateral wall formers.

7. In a box-making machine, a mandrel or core, means for applying pressure from above to the forming box, means for bearing said mandrel, end and lateral wall formers, means for horizontally moving said end and lateral wall formers with relation to said mandrel.

8. In a box-making machine, a mandrel or core, means for supporting said mandrel, means for applying pressure to the forming box, end and lateral wall formers having cam-slots, pins engaging said slots, and means for carrying or actuating said pins.

9. In a box-making machine, a mandrel or core, means for supporting said mandrel, end and lateral wall formers, means for applying pressure to the top of the forming box, means for elevating or ejecting the box, and means for removing the elevated box.

10. In a box-making machine, a mandrel or core, end and lateral wall formers, means for supporting said mandrel, means for applying pressure to the top of the forming box, means for elevating or ejecting the elevated box, means for imparting a horizontal movement to said end and lateral wall formers with relation to said mandrel, and means for removing the elevated box.

11. In a box-making machine, a mandrel or core, means for applying pressure to the top of the forming box, means for upholding said mandrel, means for ejecting the box after formation, end and lateral wall formers having cam-slotted ribs or extensions, vertically-slotted fixed uprights, pins engaging said cam and vertical slots, and actuated frames carrying said pins.

12. In a box-making machine, a mandrel or core, means for its retention in normal position, foraminous end and lateral wall formers having wire-netting applied to their inside, means for actuating said formers, means for applying pressure to the top of the forming box, means for ejecting or elevating the formed box and means for off-bearing the elevated box.

13. In a box-making machine, a mandrel or core, angular fixed corner-pieces or uprights, lateral and end wall formers movable or guided between said corner-pieces, said angular or corner pieces having vertical slots and said formers having, upon the outer surfaces, ribs or extensions provided with partly diagonal and partly vertical slots, pins engaging said slots, and actuated vertical frames carrying said pins.

14. In a box-making-machine, a mandrel or core, means for upholding said core, means for applying pressure to the top of the forming box, end and lateral wall formers, means for moving said formers with relation to said mandrel and a plate for elevating the box after formation.

15. In a machine of the character described, a mandrel or core, means for upholding said mandrel or core, end and lateral wall formers, means for moving said formers with relation to said mandrel, means for applying pressure to the top of the forming box, and a plate arranged to normally rest upon the upper end of said mandrel, said plate having downward-extending rods adapted to be engaged for elevating said plate, as in ejecting or removing the box from said mandrel or core.

16. In a machine of the character described, a mandrel or core, means for upholding said mandrel, end and lateral wall formers, means for moving said formers relatively with said mandrel or core, a plate carrying upstanding arms and adapted to be actuated, said arms having arms or dogs adapted to engage spring-catches, a frame carrying said catches and also vertical frames, and pins carried by the last-noted and engaging vertical slots and cam-slots adjunctive to said end and lateral wall formers and corner-pieces, respectively.

17. In a machine of the character described, a mandrel or core, means for upholding said mandrel, end and lateral wall formers, means for moving said formers relatively to said mandrel, means for applying pressure to the top of the forming box, means for elevating said box, a carrier adapted to receive the elevated box, and means for actuating said carrier from the box-elevating means.

18. In a machine of the character described, a mandrel or core, means for upholding said mandrel, end and lateral wall formers, means for moving said formers, relatively to said mandrel, means for applying pressure to the top of the forming box, means for elevating said box, a carrier adapted to receive the elevated box, and means for actuating said carrier from the box-elevating means, comprising an upstanding arm engaging a lever having a lateral pin or stud engaging said carrier.

19. In a machine of the character described, a mandrel or core, means for upholding said mandrel, end and lateral wall formers, means for relatively moving said formers to said mandrel, and means for collapsing said mandrel, and means for applying pressure to the top of the forming box, and means for elevating said box.

20. In a machine of the character described, a mandrel or core, means for upholding said mandrel, end and lateral wall formers, means for applying pressure to the top of the forming box, means for elevating or removing the box from said mandrel, and spring-pressed bars adapted to be actuated by the box-elevating means, means for collapsing said mandrel preparatory to the removal of the box from the machine.

21. In a machine of the character described, the corner or angled upright portions, each having a movable or sliding member or piece arranged in its angle or corner.

22. In a machine of the character described, the corner or angled upright portions, each having a movable or sliding member or piece arranged in its angle or corner, and keyed in position in their guiding or receiving grooves.

23. In a box-making machine, power-actuated means conveying lateral dogs, spring-retained catches adapted to be engaged by said dogs and carried by a fixed part, a movable frame carrying additional spring-catches adapted to engage the power-actuated means, and themselves adapted to be automatically released from said power-actuated means.

24. In a box-making machine, power-actuated means carrying lateral dogs, spring-retained catches secured to a fixed part, and adapted to engage studs on said catches, a movable frame carrying additional spring-catches and adapted to engage the power-actuated means, and, themselves adapted to be automatically released from said power-actuated means by rods connected thereto and passing through apertured stop-bars and each having a key or pin below said stop.

25. In a machine of the character described, the combination of a mandrel-engaging plate, a second plate suitably moved and carrying spring catches or bolts, and spring-pressed bars adapted to engage and support said mandrel-engaging plate, and themselves adapted to be engaged by said spring catches or bolts to release said mandrel-supporting plate to collapse the mandrel.

26. In a machine of the character described, a supporting-frame, an open-ended box fixed to said frame and having slots therein, a mandrel comprising corner-sections and wedge-sections, said corner-sections having pins extending into the slots in said box, a movable plate connected to the wedge-sections, and means for actuating said plate to collapse the mandrel.

27. In a machine of the character described, a supporting-frame, an open-ended box fixed to said frame, a mandrel comprising corner-sections and wedge-sections, means, connecting said corner-sections to said box, adapted to hold said corner-sections in the same horizontal plane but permitting them to move in said plane when the mandrel is collapsed, a movable plate connected to the wedge-sections, and means for actuating said plate to collapse the mandrel.

28. In a machine of the character described, a supporting-frame, an open-ended box fixed to said frame and having bottom corner-pieces, said box also having slots therein, a mandrel comprising corner-sections and wedge-sections, said corner-sections supported on said corner-pieces and having pins extending into the slots in said box, a movable plate connected to the wedge-sections and means for actuating said plate to collapse the mandrel.

29. In a machine of the character described, a supporting-frame, an open-ended box fixed to said frame and having horizontal and vertical slots therein, a mandrel comprising corner-sections and wedge-sections, said corner-sections having pins extending into the horizontal slots and said wedge-sections having pins extending into the vertical slots in said box, a movable plate connected to the wedge-sections, and means for actuating said plate to collapse the mandrel.

30. In a machine of the character described, the combination of a supporting-frame, an open-ended box fixed to said frame and having bottom corner-pieces, said box also having horizontal and vertical slots, a mandrel comprising corner-sections and wedge-sections, said corner-sections having pins extending into the horizontal slots and resting upon said corner-pieces, said wedge-sections having pins extending into the vertical slots in said box, a movable plate connected to the wedge-sections, and means for actuating said plate to collapse the mandrel.

In testimony whereof I affix my signature in presence of two witnesses.

WILLIAM EDWIN SCHNEIDER.

Witnesses:
 WM. A. EASTERDAY,
 GEO. E. SMITH.